United States Patent [19]

Kazami et al.

[11] Patent Number: 5,173,732
[45] Date of Patent: Dec. 22, 1992

[54] CAMERA AND PRINTING APPARATUS WITH VARIABLE TRIMMING MAGNIFICATION

[75] Inventors: Kazuyuki Kazami, Tokyo; Toshio Sosa, Narashino; Naoki Tomino, Tokyo, all of Japan

[73] Assignee: Nikon Corporation, Tokyo, Japan

[21] Appl. No.: 692,791

[22] Filed: Apr. 29, 1991

Related U.S. Application Data

[60] Continuation of Ser. No. 606,923, Oct. 31, 1990, abandoned, which is a division of Ser. No. 412,447, Sep. 26, 1989, Pat. No. 4,982,213.

[30] Foreign Application Priority Data

Sep. 29, 1988 [JP] Japan ............... 63-242593

[51] Int. Cl.⁵ .............................. G03B 27/52
[52] U.S. Cl. ........................ 355/55; 354/76
[58] Field of Search ................... 355/55-63, 355/218, 243; 354/76, 105, 106

[56] References Cited

U.S. PATENT DOCUMENTS

| | | | |
|---|---|---|---|
| 4,639,111 | 1/1987 | Harvey | 354/195.1 |
| 4,678,299 | 7/1987 | Harvey | 354/21 |
| 4,780,735 | 10/1988 | Taniguchi et al. | 354/106 |
| 4,901,106 | 2/1990 | Yamamoto | 355/55 |
| 4,982,213 | 1/1991 | Kazami et al. | 354/195.12 |

Primary Examiner—Michael L. Gellner
Assistant Examiner—David M. Gray
Attorney, Agent, or Firm—Shapiro and Shapiro

[57] ABSTRACT

A camera capable of setting trimming magnification is provided with:
  a print size input unit for entering the print size of a photograph;
  a magnification input unit for entering a desired trimming magnification;
  a determination unit for determining the maximum trimming magnification, from the print size entered by the print size input unit and a predetermined final enlarging magnification; and
  a trimming magnification setting unit for setting the trimming magnification in a photographing operation, based on the maximum trimming magnification determined by the determination unit and on the desired trimming magnification entered by the magnification input unit.

6 Claims, 4 Drawing Sheets

CAMERA AND PRINTING APPARATUS WITH VARIABLE TRIMMING MAGNIFICATION

This is a continuation of application Ser. No. 606,923 filed Oct. 31, 1990 (now abandoned); which is a division of application Ser. No. 412,447 filed Sep. 26, 1989 (now U.S. Pat. No. 4,982,213 issued Jan. , 1991).

BACKGROUND OF THE INVENTION

1. Field of the Invention

The present invention relates to a camera and a printing apparatus for use in printing with trimming.

2. Related Background Art

There is already known, for example as disclosed in the U.S. Pat. No. 4,678,299, a trimming camera adapted for use in enlarging part of a photographed frame in a printing operation, thereby providing a photograph with an effect as if lens zooming was performed in the photographing. In such camera, a desired trimming area is designated in the view finder prior to the photographing operation, and information on such trimming area is recorded on the photographic film in the photographing operation. In the printing operation, an automatic printing system reads the information recorded on the film and prints a photograph with trimming as desired by the photographer.

Such trimming camera is designed to achieve an effect equivalent to lens zooming in photographing, by enlarging a part of the image frame on the film, but the magnification of such enlargement is subject to limitation by image quality. This limitation is generally determined by the acceptable level of granularity of the enlarged photograph.

In relation to such limitation by image quality, there is already known a trimming camera capable of taking the sensitivity of the film into consideration, but in a trimming camera not provided with such capability, the image magnification in trimming is either limited to a constant value regardless of the printed size of the photograph, or is not at all limited so that the trimming area is arbitrarily selectable by the photographer.

Moreover, the final print size of the photograph is widely variable, and, a photograph may even contain plural frames therein like a small album. A constant trimming magnification means that the degree of enlargement must be kept low, without fully exploiting the possibility of further enlargement. On the other hand, a trimming magnification arbitrarily selectable by the photographer without any limitation may result in an unexpectedly coarse granularity of the finished photograph.

The image quality of a photograph is also influenced by the ISO sensitivity of the photographic film, and becomes generally worse as the ISO sensitivity increases. Consequently, in case of obtaining trimmed photographs with films of different ISO sensitivities, photographs of adequate image quality can be obtained by suitably varying the trimming magnification according to the ISO sensitivity.

SUMMARY OF THE INVENTION

An object of the present invention is, to provide a camera and a printing apparatus capable of setting an appropriate trimming magnification for the print sizes of a photograph over a wide range.

The camera of the present invention, capable of setting the trimming magnification, is characterized by:

print size input means for entering a finished print size of a photograph;

trimming magnification input means for entering a desired trimming magnification;

maximum trimming magnification setting means for calculating and setting a maximum trimming magnification from the print size entered by said print size input means and a predetermined final enlarging magnification; and trimming magnification setting means for setting the trimming magnification in a photographing operation, from the maximum trimming magnification set by said maximum trimming magnification setting means and the desired trimming magnification entered by said trimming magnification input means.

Also the printing apparatus of the present invention is characterized by:

information reader means for reading information on the trimming magnification set in the camera;

print size input means for entering a finished print size of a photograph;

maximum trimming magnification setting means for calculating and setting a maximum trimming magnification from the print size entered by said print size input means and a predetermined final enlarging magnification; and trimming magnification setting means for setting the trimming magnification in a printing operation, from the maximum trimming magnification set by said maximum trimming magnification setting means and the trimming magnification read by said reader means.

The camera of the present invention, capable of setting the trimming magnification calculates the maximum trimming magnification, from the entered print size and the predetermined final enlarging magnification, and thus sets the trimming magnification in a photographing operation from the calculated maximum trimming magnification and the desired trimming magnification entered, thereby enabling a photographing operation with appropriate image quality and trimming.

Also the printing apparatus of the present invention calculates the maximum trimming magnification from the entered print size and the predetermined final enlarging magnification, and determines the trimming magnification in a printing operation from the calculated maximum trimming magnification and the read trimming magnification, thereby providing a photograph with appropriate image quality and trimming.

DESCRIPTION OF THE PREFERRED EMBODIMENTS

Figure 1:
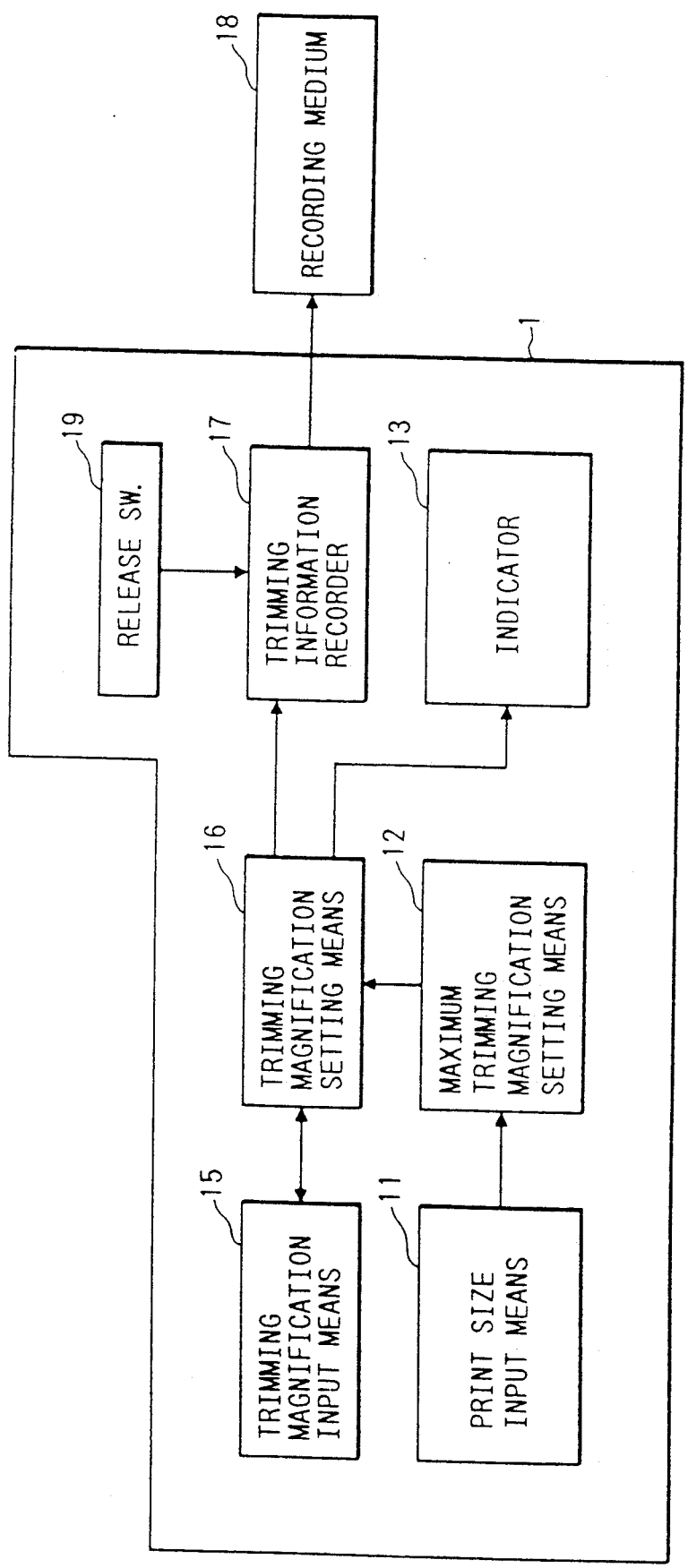
FIG. 1 is a block diagram of a camera 1, capable of setting the trimming magnification and constituting an embodiment of the present invention.

FIG. 1 is a block diagram of a camera 1, capable of setting the trimming magnification, constituting an embodiment of the present invention. Print size input means 11 is used by the photographer for manually entering a finished print size in a selective manner, such as a service size (common print size) or an album size containing plural image frames on a print. The information on print size, supplied from the print size input means 11, is sent to maximum trimming magnification setting means 12.

The maximum trimming magnification trimming means 12 determines the maximum settable trimming magnification (or minimum trimming area settable on the actual film) based on the print size, and sends corresponding information to trimming magnification setting means 16.

Trimming magnification input means 15 is composed, for example, of a dial which can be manipulated by the photographer for entering the trimming magnification in the following manner. The trimming magnification input means 15 is linked with an indicator 13 the trimming magnification setting means 16, in such a manner that the rotation of the dial causes the indicator 13 to vary the size of a rectangular frame appearing in a view finder (not shown), thereby indicating the trimming area to the photographer. The photographer can confirm the indicated trimming area, and, if necessary, further manipulates the trimming magnification input means 15 while watching the display by the indicator 13. The indicator 13 reduces or enlarges the rectangular frame in the view finder, respectively when the trimming magnification is increased or decreased.

As stated earlier, the information on the maximum trimming magnification from the maximum trimming magnification setting means 12 is also supplied to the trimming magnification setting means 16, and, if the maximum trimming magnification indicated by that information is exceeded by the trimming magnification entered from the trimming magnification input means 15, the trimming magnification setting means 16 forcedly limits the maximum value of the trimming magnification that can be entered from the input means 15 at the maximum trimming magnification.

Consequently the photographer can know the maximum trimming magnification for the entered print size, from the minimum area displayed by the indicator 13, namely the area that cannot be reduced further in size.

A trimming information recorder 17 receives the information on the trimming magnification from the trimming magnification setting means 16, and records the information, when a release switch 19 is closed, said information on a recording medium 18 such as a film or an EPROM on a film cartridge. The method of such recording is already known and will not, therefore, be explained in detail.

The camera may also have another mode, selectable for example by a selector switch, in which the limitation by the maximum trimming magnification can be overridden and the photographer can set a trimming area smaller than the minimum trimming area, combined with the display of the minimum trimming area corresponding to the maximum trimming magnification in the view finder.

Figure 4:
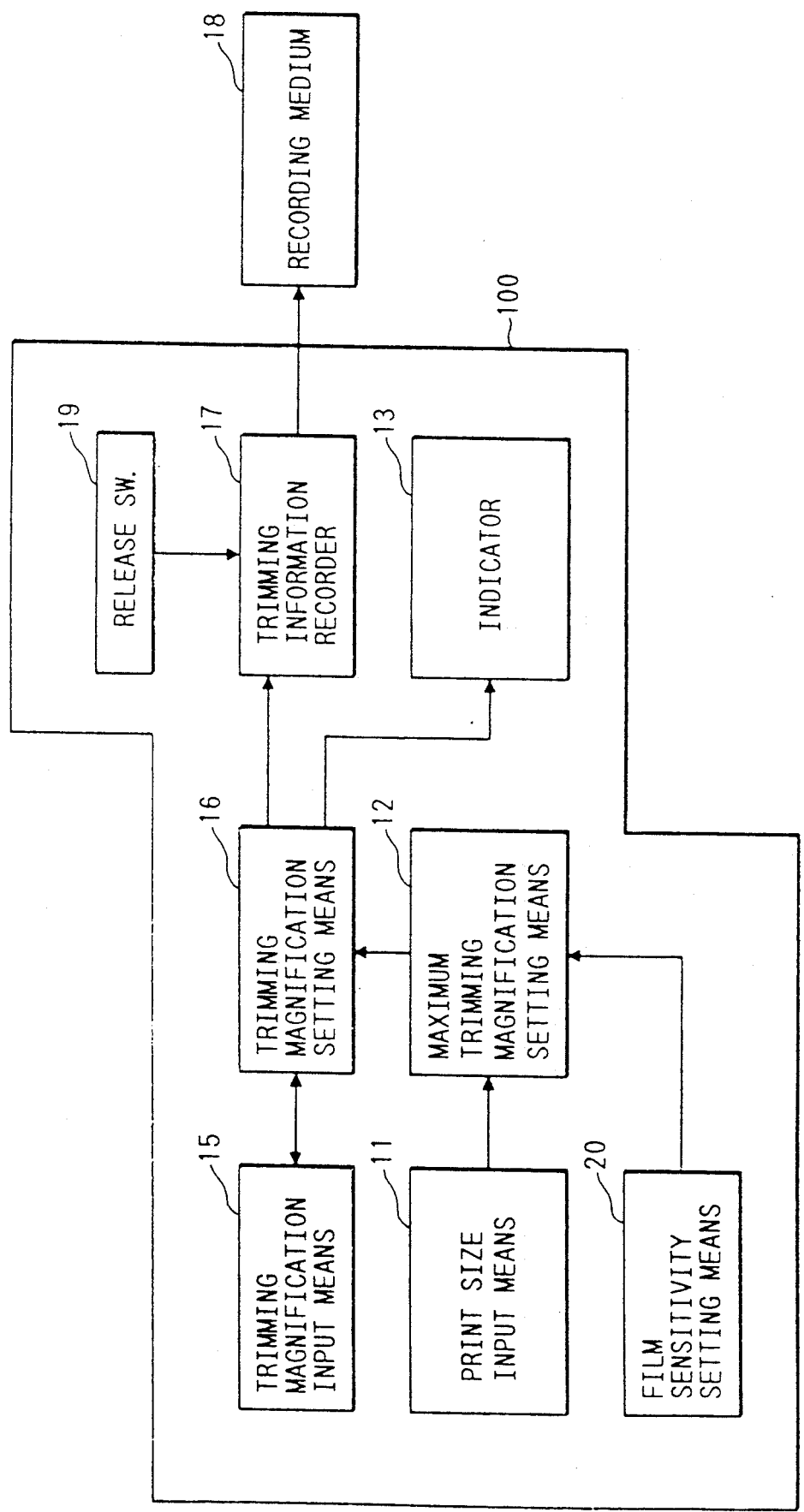
FIG. 4 is a block diagram of a camera 100 constituting still another embodiment.

The camera 100 of another embodiment, shown in FIG. 4, capable of setting the maximum trimming magnification in consideration of the film sensitivity, can be obtained by adding film sensitivity setting means 20 parallel to the print size input means 11 in the camera 1 shown in FIG. 1. The embodiment of FIG. 4 is similar to the first embodiment explained above in the structure and function, except the film sensitivity setting means 20, so that the following description will only consider the different part. Also the film sensitivity setting means 20 is already known and will not, therefore, be explained in detail.

The film sensitivity setting means 20 sends information on the film sensitivity to the maximum trimming magnification setting means 12, which also receives the print size from the print size input means 11 as explained above and determines the maximum trimming magnification based on the print size and the information on film sensitivity, as in the first embodiment.

Figure 2:
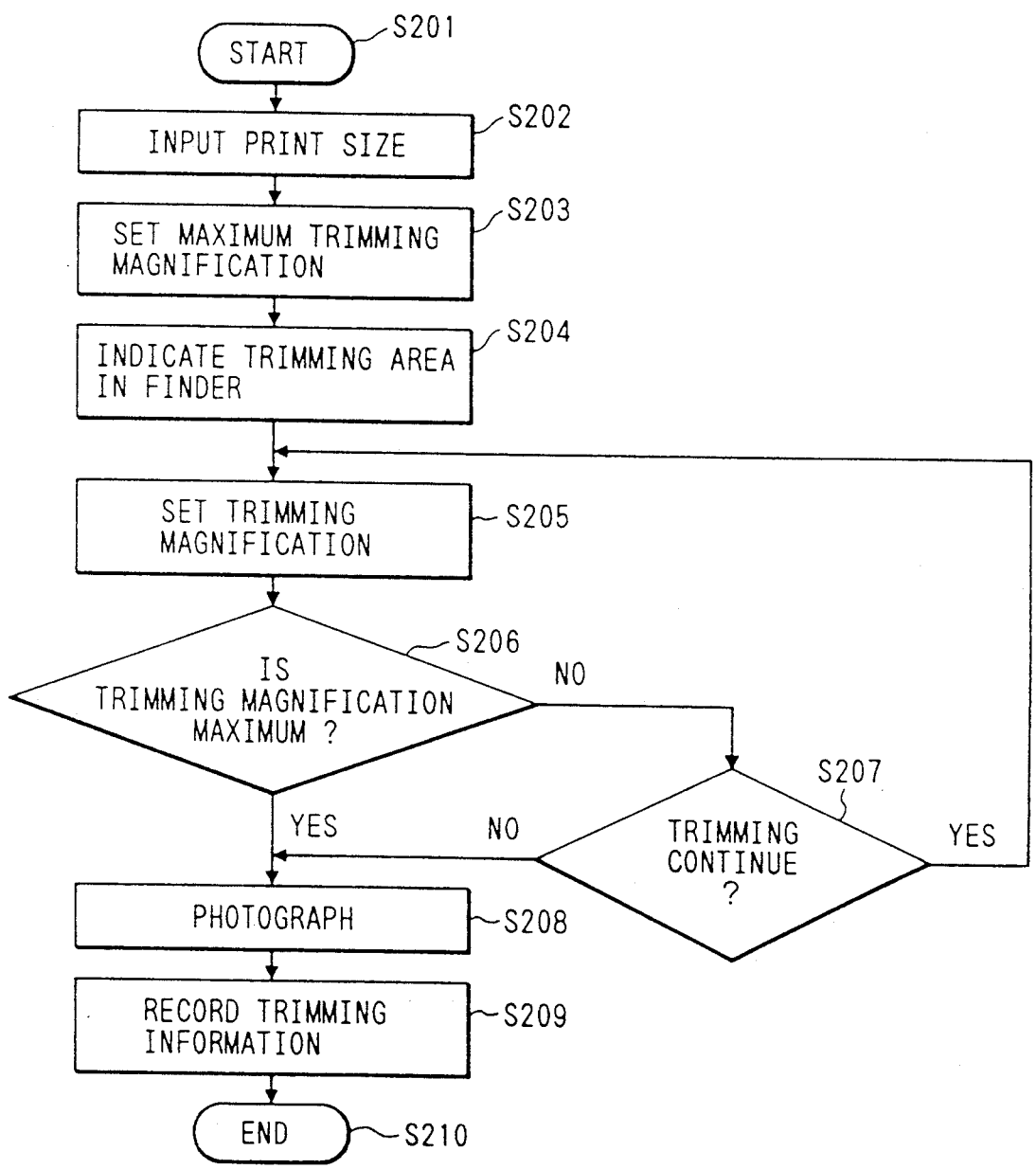
FIG. 2 is a flow chart showing the control sequence of a photographing operation with trimming by means of the camera of the present invention.

FIG. 2 is a flow chart showing the control sequence of photographing with trimming, by means of the camera 1 shown in FIG. 1. At first the photographer selects the print size of the final print, by means of the print size input means 11 of the camera shown in FIG. 1 (step S202). In the present example it is assumed that the photographer can select either the service size (usual print size) or the album size containing plural image frames.

A next step S203 causes the maximum trimming magnification setting means 12 to calculate the maximum trimming magnification for each print size. In the following it is assumed that a frame on the film is enlarged 4 times for the service size, or 2 times for the album size, when the entire frame is enlarged.

The acceptable level of image quality of a photograph is not fixed, but it is assumed, in the following description, that the maximum trimming magnification providing an acceptable image quality on the print of service size is about 3 times. This is determined in consideration of the print size. The deterioration in image quality is more conspicuous in larger sizes than in smaller sizes. Thus the final enlarging magnification, which is equal to the enlarging magnification in the entire frame enlargement multiplied by the maximum trimming magnification, is made constant (12 times in this case), thus:

$$\text{(enlarging magnification)} \times \text{(maximum trimming magnification)} = \text{(final enlarging magnification)} \quad (1)$$

This equation (1) is stored in advance in the maximum trimming magnification setting means 12.

In case the final enlarging magnification for the service size is 12 times, the maximum trimming magnification for the album size is 6 times because the enlarging magnification for the entire frame enlargement is 2 times for the album size. However the maximum trimming magnification is variable according to the film and the development used, and is not fixed in the present invention. The maximum trimming magnification is determined from the input print size and the final enlarging magnification, and the minimum trimming area corresponding to the maximum trimming magnification is displayed in the view finder (step S204).

Then the photographer sets the trimming area by means of the trimming magnification input means 15 (FIG. 1), under observation in the view finder (step S205). Then there is discriminated whether the set trimming area is equal to the minimum trimming area corresponding to the maximum trimming magnification (step S206). If not, the sequence proceeds to a step S207, and the photographer decides whether or not to continue the operation for setting the trimming area. If to be continued, the sequence returns to the step S205 to repeat the above-explained sequence. If not, the sequence proceeds to a step S208 for effecting trimmed photographing, with the trimming magnification thus set.

If the step S206 identifies that the trimming magnification set by the input means 15 is equal to the maximum trimming magnification, the function of the input means 15 is so limited as not to increase the trimming magnification further, and then the step S208 executes photographing with the maximum trimming magnification.

Simultaneous with the shutter releasing operation, the trimming information is recorded on the film (step S209). The print operator or the automatic print system reads the recorded trimming information, and prints the photograph with the trimming desired by the photographer.

In the present embodiment, the state of trimming is visualized in the view finder by a rectangular frame, which becomes larger or smaller corresponding to the zooming operation of the lens, but stops in size when the maximum trimming magnification is reached, corresponding to the entered print size. However, it is also possible to enter the trimming magnification numerically and to prohibit the entry of a number exceeding the calculated maximum value.

In the foregoing description it is assumed that the print size is set at first, but there can be considered other embodiments as well:

1) The print size is set after the trimming operation, and the frame in the view finder expands automatically to the minimum trimming area if the maximum trimming magnification is exceeded;

2) When the final trimming magnification is set by the photographer, there is given an alarm that the value is set manually; and 3) When print size is set after photographing, the trimming information is cancelled or corrected.

These embodiments can be easily achieved by variation of the above-explained embodiment.

Also in another embodiment, the trimming magnification input means 15 and the trimming information recorder 17 may be dispensed with, since the photographer can know the minimum trimming area by the indicator 13 in the photographing operation, so that he can transmit the extent of desired trimming orally to the developing operator, instead of recording the information on trimming on the film.

In the above-explained embodiment, the minimum trimming area is displayed by entering the print size, but it is also possible to designate a print size of appropriate image quality by entering the minimum trimming area, and the photographer can thus transmit the designated print size to the developing operator after the photographing operation.

Also in the first embodiment, the trimming area input means indicates the trimming area by a rectangular frame in the view finder, but it is also possible to axially move a lens provided in the view finder, thereby showing the trimming area in the form of an enlarged image over the entire frame of the view finder.

Figure 3:
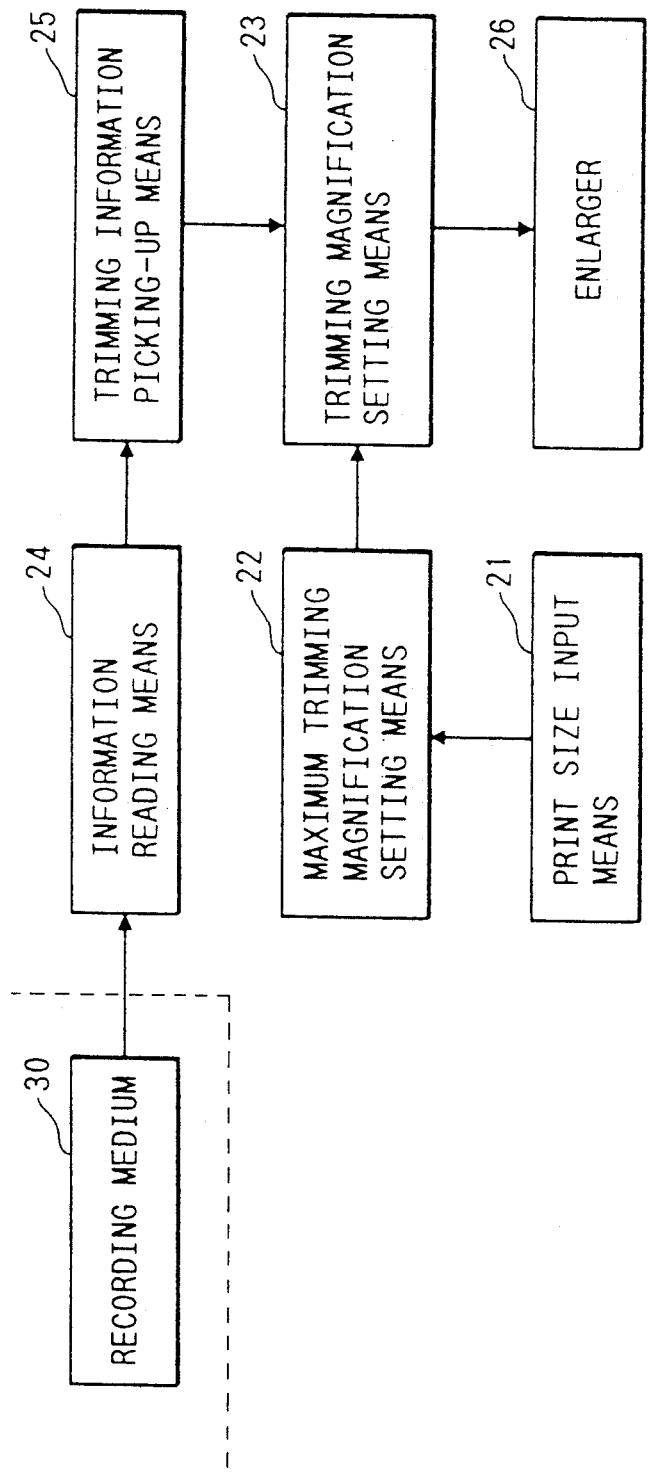
FIG. 3 is a block diagram of a printing apparatus, capable of setting the trimming magnification and constituting another embodiment of the present invention.

FIG. 3 is a block diagram of a printing apparatus with variable trimming magnification, constituting another embodiment of the present invention.

The film exposed in the camera with variable trimming magnification is developed, and is printed by the printing apparatus. In the processing of the printing system, the recording medium, or exposed film, 30 with the photographing information (for example on trimming magnification, exposure and color correction) is read by information reading means 24 of the printing apparatus.

Various information read by the reading means 24 is used in various steps of the printing. Among such information, the trimming magnification is extracted by trimming information pickup means 25 and supplied to trimming magnification setting means 23.

Also in the printing apparatus, for providing a print of the print size desired by the user, the desired print size is entered by print size input means 21, which sends the entered print size to maximum trimming magnification setting means 22.

The maximum trimming magnification setting means 22 calculates the maximum trimming magnification according to the equation (1) as in the afore-mentioned maximum trimming magnification setting means 12, and sends the information on maximum trimming magnification to trimming magnification setting means 23.

The trimming magnification setting means 23 compares the information on the desired trimming magnification from the trimming information pickup means 25 with the information on the maximum trimming magnification from the maximum trimming magnification setting means 22, and, as in the aforementioned trimming magnification setting means 16, the maximum trimming magnification is automatically selected if the desired trimming magnification exceeds the maximum trimming magnification. On the other hand, the desired trimming magnification is set if it does not exceed the maximum trimming magnification. It is also possible to override the limitation by the maximum trimming magnification for example with a selector switch, thereby enabling the setting of a magnification larger than the maximum trimming magnification.

The trimming magnification set by the setting means 23 is supplied to an enlarger 26, which effects the printing operation with the trimming magnification.

As explained in the foregoing, the camera of the present invention capable of setting the trimming magnification is adapted to calculate the maximum trimming magnification from the entered print size and the predetermined final enlarging magnification, and sets the trimming magnification in a photographing operation based on thus calculated maximum trimming magnification and the desired trimming magnification, whereby the photographing operation can be conducted so as to obtain appropriate image quality and trimming.

Also the printing apparatus of the present invention is adapted to calculate the maximum trimming magnification from the entered print size and the predetermined final enlarging magnification, and sets the trimming magnification in a printing operation based on the set maximum trimming magnification and the read trimming magnification, whereby a photograph can be obtained with suitable image quality and amount of trimming.

What is claimed is:

1. A printing apparatus comprising:
   information reader means for reading information on trimming magnification;
   print size input means for entering a print size of the photograph;
   determination means for determining the maximum trimming magnification from the print size entered by said print size input means and a predetermined final enlarging magnification; and trimming magnification setting means for setting the trimming magnification at the printing, based on the maximum trimming magnification determined by said determination means and the trimming magnification read by said reader means.

2. A printing apparatus according to claim 1, further comprising selector means for selecting a first mode or a second mode;

wherein, in said first mode, when a trimming magnification exceeding the maximum trimming magnification determined by said determination means is read by said reader means, said trimming magnification setting means is adapted to set said maximum trimming magnification as the trimming magnification at the photograph printing operation; and wherein, in said second mode, when a trimming magnification exceeding the maximum trimming magnification determined by said determination means is read by said reader means, said trimming magnification setting means is adapted to set said read trimming magnification as the trimming magnification at the photograph printing operation.

3. A printing apparatus according to claim 1, wherein said information reader means is adapted to read information on trimming magnification recorded on a recording medium.

4. A printing apparatus comprising:

first means for providing information on trimming magnification;

second means for providing information on a print size of a photograph;

determination means for determining the maximum trimming magnification from the print size provided by said second means; and trimming magnification setting means for setting the trimming magnification for the printing of said photograph, based on the maximum trimming magnification determined by said determination means and the trimming magnification provided by said first means.

5. A printing apparatus according to claim 4, further comprising selector means for selecting a first mode or a second mode;

wherein, in said first mode, when a trimming magnification exceeding the maximum trimming magnification determined by said determination means is provided by said first means, said trimming magnification setting means is adapted to set the maximum magnification determined by said determination means for the printing of said photograph; and wherein, in said second mode, when a trimming magnification exceeding the maximum trimming magnification determined by said determination means if provided by said first means, said trimming magnification setting means is adapted to set the trimming magnification provided by said first means for the printing of said photograph.

6. A printing apparatus according to claim 5, wherein said first means is adapted to provide information on trimming magnification recorded on a recording medium.

* * * * *